United States Patent [19]

Jennings

[11] Patent Number: 5,310,003
[45] Date of Patent: May 10, 1994

[54] METHOD FOR ACID FRACTURING A SUBTERRANEAN FORMATION

[75] Inventor: Alfred R. Jennings, Plano, Tex.

[73] Assignee: Mobil Oil Corporation, Fairfax, Va.

[21] Appl. No.: 47,987

[22] Filed: Apr. 19, 1993

[51] Int. Cl.$^5$ .................. E21B 43/26; E21B 43/27
[52] U.S. Cl. .................. 166/307; 166/269; 166/308
[58] Field of Search ............. 166/307, 308, 269, 271, 166/259

[56] References Cited

U.S. PATENT DOCUMENTS

| | | | |
|---|---|---|---|
| 4,787,456 | 11/1988 | Jennings, Jr. et al. | 166/281 |
| 4,807,703 | 2/1989 | Jennings, Jr. | 166/307 |
| 4,842,068 | 6/1989 | Vercaemer et al. | 166/269 |
| 4,917,185 | 4/1990 | Jennings, Jr. et al. | 166/281 |
| 5,018,578 | 5/1991 | El Raba et al. | 166/269 X |

Primary Examiner—Stephen J. Novosad
Attorney, Agent, or Firm—Alexander J. McKillop; George W. Hager, Jr.

[57] ABSTRACT

A hydrocarbon reservoir within a subterranean formation surrounding a wellbore is simultaneously fractured within an upper zone with a lower density acid and within a lower zone with a higher density acid. As the fracturing propagates through the reservoir, the lower portion of the fracture within the upper zone of the reservoir intersects with the upper portion of the fracture within the lower zone of the reservoir. The lower density acid remains within the upper zone of the reservoir propagating the fracture therein while the higher density acid remains within the lower zone of the reservoir propagating the fracture therein.

6 Claims, 1 Drawing Sheet

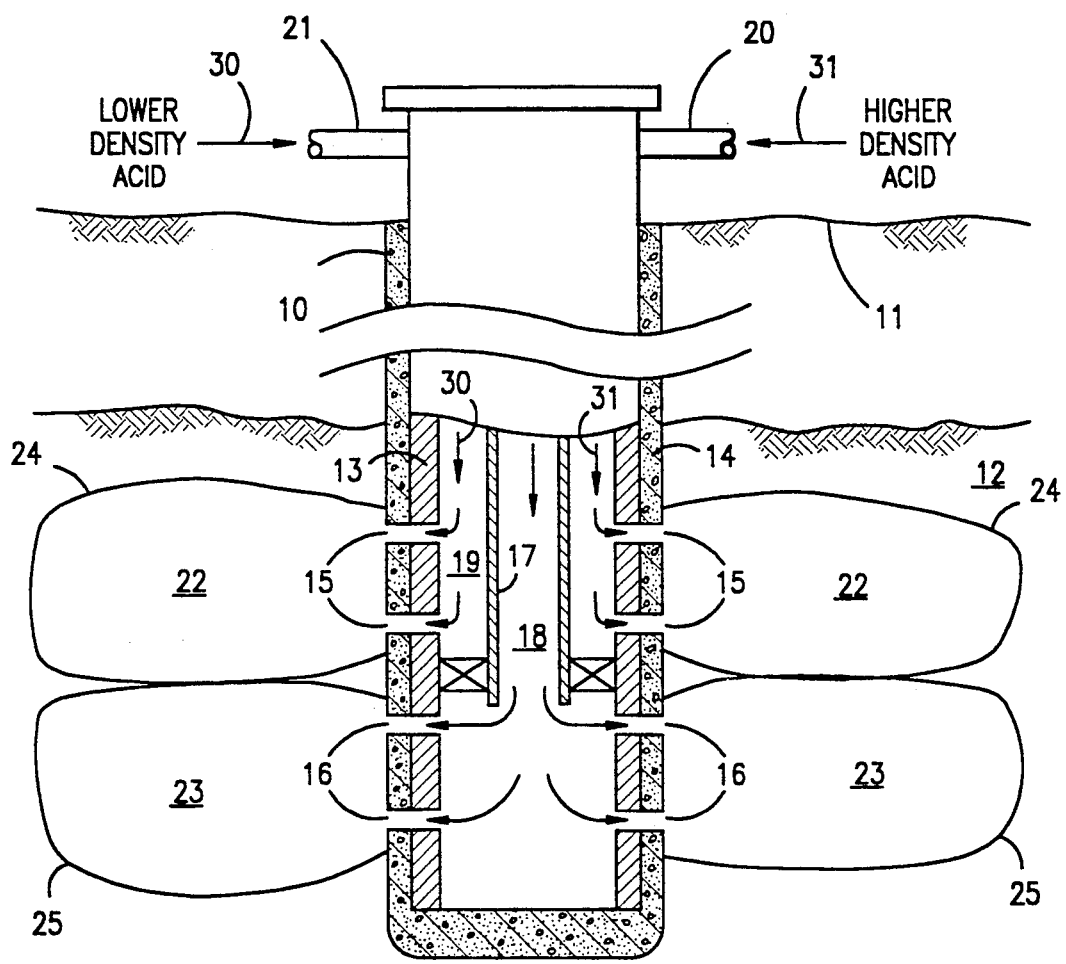

METHOD FOR ACID FRACTURING A SUBTERRANEAN FORMATION

BACKGROUND OF THE INVENTION

The invention relates to acidizing a subterranean formation and, more particularly, to a new and improved method for acid fracturing a formation surrounding a wellbore.

It is common practice to acidize subterranean formations in order to increase the permeability thereof. For example, in the petroleum industry it is conventional to inject an acidizing fluid into a well in order to increase the permeability of a surrounding hydrocarbon-bearing formation and thus facilitate the flow of hydrocarbon fluids into the well from the formation or the injection of fluids, such as gas or water, from the well into the formation. Such acidizing techniques may be carried out as "matrix acidizing" procedures or as "acid fracturing" procedures.

In matrix acidizing, the acidizing fluid is passed into the formation from the well at a pressure below the breakdown pressure of the formation. In this case, increase in permeability is effected primarily by the chemical reaction of the acid within the formation with little or no permeability increase being due to mechanical distortions within the formation as in fracturing.

In acid fracturing, the acidizing fluid is disposed within the well opposite the formation to be fractured. Thereafter, sufficient pressure is applied to the acidizing fluid to cause the formation to break down with the resultant production of one or more fractures therein. An increase in permeability thus is effected by the acid etching of the fractures formed as well as by the chemical reaction of the acid within the formation.

In yet another technique involving acidizing, the formation is fractured initially using an inert fluid. (Inert fluids may be gelled water containing polymers such as hydroxypropyl cellulose). Thereafter, an acidizing fluid is injected into the formation at fracturing pressures to extend the created fracture and to "finger through" the fracture filled with the inert fluid. The acid functions to dissolve formation materials forming the walls of the fracture, thus increasing the width and permeability thereof.

In A. R. Jennings, Jr. U.S. Pat. No. 4,807,703, there is described an acid treatment of a subterranean formation to improve productivity of hydrocarbons from a reservoir therein employing an acid fracturing of the formation surrounding a well pentrating the hydrocarbon reservoir. Such acid treatment involves the injection of a gelled and foamed acid into a formation under conditions and pressures sufficient to fracture the formation and create a foam pad in the face of at least one resultant fracture. Thereafter, an ungelled and foamed acid is injected into the fracture which acid "fingers" through the foam pad thereby unevenly etching the fracture and propagating to substantially further distances into the formation. When the acid is spent and the desired amount of etching and fracturing is obtained, the gelled composition is removed from the formation. Hydrocarbon fluids are then produced from the formation.

SUMMARY OF THE INVENTION

The present invention is directed to a method for the acid fracturing of a hydrocarbon reservoir within a subterranean formation surrounding a wellbore. More particularly, a lower density acid is injected into an upper zone of the reservoir surrounding the wellbore at a pressure sufficient to initiate the propagation of a hydraulic fracture within such upper zone. A higher density acid is injected into a lower zone of the reservoir surrounding the wellbore at a pressure sufficient to initiate the propagation of a fracture within such lower zone such that the upper portion of the fracture within the lower zone of the reservoir intersects the lower portion of the fracture within the upper zone of the reservoir. The lower density acid remains in the upper zone of the reservoir propagating the fracture therein while the higher density acid remains in the lower zone of the reservoir propagating the fracture therein.

In a further aspect, differing volumes of lower and higher density acids ar injected into the reservoir to selectively control the fracturing of the upper zone of the reservoir with respect to the lower zone of the reservoir.

BRIEF DESCRIPTION OF THE DRAWING

The sole figure of drawings pictorially depicts a hydrocarbon reservoir within a subterranean formation surrounding a wellbore being acid fractured in accordance with the method of the present invention.

DESCRIPTION OF THE PREFERRED EMBODIMENT

For a description of the acid fracturing method of the present invention, reference is made to the drawing where there is shown a well 10 which extends from the surface of the earth 11 and penetrates a subterranean hydrocarbon reservoir 12 which is to be fractured. The well 10 would include a casing 13 which is cemented into place by a cement sheath 14. Perforations 15 and 16 are provided through the casing 13 and cement sheath 14 to provide open communication between the interior of the well 10 and the hydrocarbon reservoir 12.

A tubing 17 runs down the casing 13 past perforations 15 and terminates before reaching perforations 16. A retrievable packer 18 positioned at the lower end of tubing 17 isolates the central passageway 18 of tubing 17 from the annulus 19 formed between tubing 17 and casing 13. Injection port 20 on the earth's surface is in fluid communication with passageway 18 through tubing 17 and injection port also on the earth's surface is in fluid communication with the annulus 19.

In carrying out the acid fracturing of hydrocarbon reservoir 12 differing densities of an aqueous solution of an acid are pumped under pressure into the injection ports 20 and 21. The lower density fracturing acid flows through injection port 21, down through annulus 19 and out through perforations 15 into an upper zone 22 of hydrocarbon reservoir 12 as shown by the arrows 30. The higher density fracturing acid flows through injection port 20, down through passageway 18 of tubing 17 and out through perforations 16 into a lower zone 23 of hydrocarbon reservoir 12, as shown by the arrows 31. Such fracturing acids are pumped simultaneously or sequentially under conditions and pressure sufficient to fracture the hydrocarbon reservoir 12 as shown by the fracture 24 in the upper portion of the reservoir and by the fracture 25 in the lower portion of the reservoir. As these two fractures propagate outward from the well the lower part of the fracture 24 intersects with the upper part of the fracture 25 to create a single, enlarged fracture interval within the reservoir. Since the acid densities are different in the upper zone 22 and lower zone 23, the acids do not commingle within the single enlarged fracture area. The lower density acid remains in upper zone 22 to continue the propagation outwardly from the well of fracture 24, while the higher density acid remains in the lower zone 23 to continue the propagation outwardly from the well of fracture 25.

A density differential at least in the order of about 0.5 pounds per gallon will be sufficient to insure that there is no commingling of the lower and higher density acids. For example, if the lower density acid is in the range of about 9.5 to about 10.0 pounds per gallon, then the higher density acid should be at least in the range of about 10.0 to 10.5 pounds per gallon.

In a further aspect of the invention, the acid treatment can be designed to tailor the configurations of each of the upper and lower fractures. For example, differing volumes of the lower and higher density acids are injected through ports 21 and 20 respectively to selectively control the propagation of the fracture 24 in the upper reservoir zone 22 with respect to the propagation of the fracture 25 in the lower reservoir zone 23.

The fracturing acid utilized may be any of the aqueous solutions of acid commonly employed for acidizing formations. For example, the acid may preferably be an aqueous solution of hydrochloric acid. Although hydrochloric acid is preferred, the following aqueous solutions of organic acids may also be utilized: formic, acetic and oxalic. When hydrochloric acid is utilized, it should be a concentration of about 5 to about 28 percent by weight of hydrogen chloride. The use of aqueous solutions of hydrochloric acid for acidizing subterranean formations is described in A. R. Jennings, Jr. U.S. Pat. Nos. 4,787,456 and 4,917,185, the teachings of which are incorporated herein by reference.

In some reservoirs, the upper and lower zones may be formed from different types of carbonate formations such as dolomite and limestone as examples. One difficulty encountered in acid fracturing of such a reservoir is the differing reaction rates of the fracturing acid with the differing dolomite and limestone zones of the reservoir with which the acid comes into contact. To overcome such a difficulty, it might be desirable to use a different acid in each of the formations. For example, in the less reactive dolomite zone a hydrochloric acid would be the preferred fracturing acid, while in the more reactive limestone zone an organic acid would be the preferred fracturing acid.

I claim:

1. A method for the acid fracturing of a hydrocarbon reservoir within a subterranean formation surrounding a wellbore, comprising the steps of:
   a) injecting a lower density fracturing acid into an upper zone of said reservoir surrounding said wellbore at a pressure sufficient to initiate the propagation of a fracture within said upper zone, and
   b) injecting a higher density fracturing acid into a lower zone of said reservoir surrounding said wellbore at a pressure sufficient to initiate the propagation of a fracture within said lower zone such that the upper portion of the fracture within the lower zone of the reservoir intersects the lower portion of the fracture within the upper zone of the reservoir, the lower density fracturing acid remaining in the upper zone of the reservoir propagating the fracture therein and the higher density fracturing acid remaining in the lower zone of the reservoir propagating the fracture therein.

2. The method of claim 1 wherein differing volumes of said lower and higher density fracturing acids are injected into said reservoir to selectively control the fracturing of the upper zone of said reservoir with respect to the lower zone of the reservoir.

3. The method of claim 1 wherein the density differential between said lower and higher density fracturing acids is at least about 0.5 pounds per gallon.

4. The method of claim 1 wherein said lower and higher density fracturing acids are different acids.

5. The method of claim 4 wherein one of said lower and higher density fracturing acids is a hydrochloric acid and the other of said lower and higher density fracturing acids is an organic acid.

6. The method of claim 5 wherein said hydrochloric acid is injected as the fracturing acid into the most reactive of said upper and lower reservoir zones and said organic acid is injected as the fracturing acid into the least reactive of said upper and lower reservoir zones

* * * * *